United States Patent
Watanabe et al.

(10) Patent No.: US 11,586,523 B2
(45) Date of Patent: Feb. 21, 2023

(54) 3D MODEL EVALUATION SYSTEM

(71) Applicant: FUJIFILM Business Innovation Corp., Tokyo (JP)

(72) Inventors: Keiko Watanabe, Kanagawa (JP); Eiji Inoue, Kanagawa (JP); Hideaki Hirata, Kanagawa (JP); Isamu Ishii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 284 days.

(21) Appl. No.: 16/882,551

(22) Filed: May 25, 2020

(65) Prior Publication Data

US 2021/0124670 A1    Apr. 29, 2021

(30) Foreign Application Priority Data

Oct. 23, 2019   (JP) .............................. JP2019-192588

(51) Int. Cl.
| | |
|---|---|
| *G06F 11/34* | (2006.01) |
| *G06F 30/20* | (2020.01) |
| *G06F 30/13* | (2020.01) |
| *G06F 30/15* | (2020.01) |
| *G06F 30/17* | (2020.01) |
| *G06F 119/02* | (2020.01) |

(52) U.S. Cl.
CPC .......... *G06F 11/3447* (2013.01); *G06F 30/20* (2020.01); *G06F 11/3457* (2013.01); *G06F 30/13* (2020.01); *G06F 30/15* (2020.01); *G06F 30/17* (2020.01); *G06F 2119/02* (2020.01)

(58) Field of Classification Search
CPC .. G06F 11/3447; G06F 11/3457; G06F 30/13; G06F 30/15; G06F 30/17; G06F 30/20; G06F 2119/02; G06T 15/00; G06T 17/00
USPC .............. 345/419, 420; 703/1, 2, 6; 702/182
See application file for complete search history.

(56) References Cited

U.S. PATENT DOCUMENTS

| | | | | |
|---|---|---|---|---|
| 6,920,620 | B2* | 7/2005 | Hsiao .................... | G06F 30/398 |
| | | | | 716/112 |
| 7,145,563 | B2* | 12/2006 | Yamagata ............... | G06T 17/20 |
| | | | | 345/423 |
| 11,030,352 | B2* | 6/2021 | Hama ..................... | G06F 30/00 |
| 11,341,289 | B2* | 5/2022 | Coskun ................... | G06F 30/00 |
| 2003/0135831 | A1* | 7/2003 | Hsiao .................... | G06F 30/398 |
| | | | | 716/112 |
| 2006/0269143 | A1* | 11/2006 | Kozakaya ............ | G06V 40/172 |
| | | | | 382/218 |

(Continued)

FOREIGN PATENT DOCUMENTS

| | | | | |
|---|---|---|---|---|
| CN | 101542490 A | * | 9/2009 | ............. B33Y 50/00 |
| EP | 3667544 A1 | * | 6/2020 | ......... G06F 17/5018 |

(Continued)

*Primary Examiner* — Phallaka Kik
(74) *Attorney, Agent, or Firm* — JCIPRNET

(57) ABSTRACT

A 3D model evaluation system includes: a loading unit that loads 3D model data created by 3D CAD; a history checking unit that checks a creation history which is added to the 3D model data loaded by the loading unit and which is obtained in a case where the 3D model data is created by the 3D CAD; and an evaluation unit that evaluates a degree of coincidence between the creation history of the 3D model data checked by the history checking unit and a predetermined rule.

8 Claims, 19 Drawing Sheets

(56) References Cited

U.S. PATENT DOCUMENTS

| | | | |
|---|---|---|---|
| 2007/0233298 A1* | 10/2007 | Heide | G06F 30/00 |
| | | | 700/118 |
| 2012/0242824 A1* | 9/2012 | Takahashi | G01B 11/0608 |
| | | | 348/86 |
| 2016/0071684 A1* | 3/2016 | Platzgummer | H01J 37/3045 |
| | | | 700/117 |
| 2016/0110871 A1* | 4/2016 | Kang | A61B 8/4254 |
| | | | 382/128 |
| 2020/0160613 A1* | 5/2020 | Han | G06V 40/103 |

FOREIGN PATENT DOCUMENTS

| | | | |
|---|---|---|---|
| JP | 2006107102 | | 4/2006 |
| JP | 2007233810 | | 9/2007 |
| JP | 2012079079 A | * | 4/2012 |
| JP | 5581951 B2 | * | 9/2014 |

\* cited by examiner

SKETCH ON XY PLANE   SKETCH ON YZ PLANE   SKETCH ON ZX PLANE

FIG. 23

PERSONAL ANALYSIS

TARGET DATA
· OK_SAMPLE.SLDPRT

◆ FX MODELING ANALYSIS RESULT    ◆ FX MODELING ADAPTATION DEGREE CHECK

✓ = ADAPTED ITEM
= NOT ADAPTED ITEM

| FX MODELING ADAPTATION NUMBER | FX MODELING ITEM | ADAPTATION DEGREE | ADAPTATION DEGREE FOR SPECIFIC ITEM | MANUAL PAGE |
|---|---|---|---|---|
| ADAPTATION OF 19 ITEMS (TOTAL 19 ITEMS) | ■ FUNCTION-BASED MODELING | A | ✓ NUMBER OF HISTORIES<br>□ NUMBER OF S ELEMENTS<br>□ UNNECESSARY HISTORY<br>□ F BALANCE | FUNCTION-BASED MODELING (1) TO (3)<br>FUNCTION-BASED MODELING (1)<br>FUNCTION-BASED MODELING (2)<br>FUNCTION-BASED MODELING (3) |
| | ■ NO OCCURRENCE OF ERROR | A | □ CONSTRAINT REFERENCE<br>□ S PLANE DEFINITION<br>□ F DEFINITION | NO OCCURRENCE OF ERROR (1)<br>NO OCCURRENCE OF ERROR (2)<br>NO OCCURRENCE OF ERROR (3) |
| | ■ DESIGN INTENT / CRITERION | A | ✓ Layout<br>✓ FUNCTION-BASED L<br>□ PERFECT DEFINITION<br>□ PLANE UTILIZATION<br>□ FEATURE NAME | DESIGN INTENT / CRITERION (1)<br>DESIGN INTENT / CRITERION (2)<br>DESIGN INTENT / CRITERION (3)<br>DESIGN INTENT / CRITERION (4)<br>DESIGN INTENT / CRITERION (5) |
| | ■ FUNCTION-BASED Fillet | A | □ Fillet | FUNCTION-BASED Fillet |
| | ■ DEPRECATED TECHNIQUE | A | ✓ OUTSIDE REFERENCE<br>□ OUTLINE SELECTION<br>□ DIRECT<br>□ FREE CHANGE<br>□ MULTI-BODY<br>□ DEPRECATED PLATE | DEPRECATED TECHNIQUE (1)<br>DEPRECATED TECHNIQUE (2)<br>DEPRECATED TECHNIQUE (3)<br>DEPRECATED TECHNIQUE (4)<br>DEPRECATED TECHNIQUE (5)<br>DEPRECATED TECHNIQUE (6) |

TREND RADAR CHART

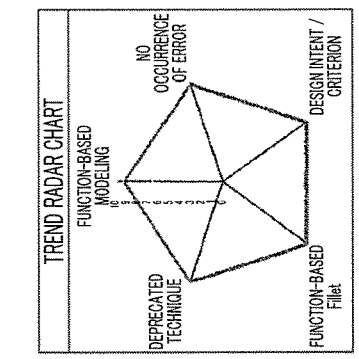

◆ DATA SHAPE

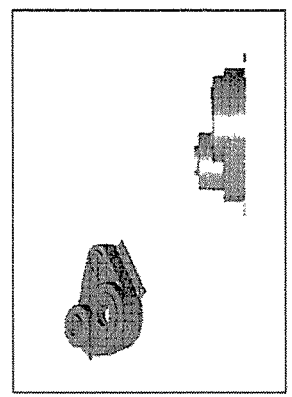

FX MODELING DETAIL

◆ DATA INFORMATION

| ■ BASE INFORMATION | · NUMBER OF FACES<br>· REBUILDING TIME<br>· TOTAL FEATURE NUMBER<br>· TOTAL SKETCH FEATURE NUMBER |
|---|---|
| ■ STATE INFORMATION | · GEOMETRY ERROR<br>· FEATURE ERROR<br>· REBUILDING STANDBY STATE<br>· ROLLBACK STATE |

# 3D MODEL EVALUATION SYSTEM

CROSS-REFERENCE TO RELATED APPLICATIONS

This application is based on and claims priority under 35 USC 119 from Japanese Patent Application No. 2019-192588 filed Oct. 23, 2019.

BACKGROUND

(i) Technical Field

The present invention relates to a 3D model evaluation system.

(ii) Related Art

In the related art, the three-dimensional computer aided design (3D CAD) is used for designing devices and parts such as image forming apparatuses. As a technology related to a product environment assessment evaluation system based on a 3D model using 3D CAD, for example, a technology disclosed in JP2006-107102A or the like has already been proposed. The product environment assessment evaluation is to evaluate the quality of 3D model data in product data quality (PDQ: model data quality) such that trouble does not occur in a case where 3D model data is exchanged.

JP2006-107102A relates to an environmental assessment evaluation device for each product and each unit constituting the product. The environmental assessment evaluation device is configured to include: a unit that acquires information about a unit configuration of the product and constituent parts in the units, material information about a material of each part, and processing information from 3D CAD; a unit that acquires environmental information by searching the environmental information database on the basis of the material information and the processing information; and a unit that stores the collection result data obtained by collecting the information pieces in a dedicated database for each environmental assessment evaluation target product and each unit.

SUMMARY

Aspects of non-limiting embodiments of the present disclosure relate to a 3D model evaluation system capable of easily evaluating a degree of easiness in utilizing the 3D model data in comparison with the case of acquiring and evaluating the information about the unit configuration of the product and constituent parts in the units, the material information about the material of each part, and the processing information are acquired from 3D CAD.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a 3D model evaluation system including:

a loading unit that loads 3D model data created by 3D CAD;

a history checking unit that checks a creation history which is added to the 3D model data loaded by the loading unit and which is obtained in a case where the 3D model data is created by the 3D CAD; and an evaluation unit that evaluates a degree of coincidence between the creation history of the 3D model data checked by the history checking unit and a predetermined rule.

BRIEF DESCRIPTION OF THE DRAWINGS

Exemplary embodiment(s) of the present invention will be described in detail based on the following figures, wherein:

FIG. 23 is a chart showing evaluation results using the 3D model evaluation system according to Exemplary Embodiment 1 of the present invention.

DETAILED DESCRIPTION

An exemplary embodiment of the present invention will be described below with reference to the drawings.

Exemplary Embodiment 1

Figure 1:
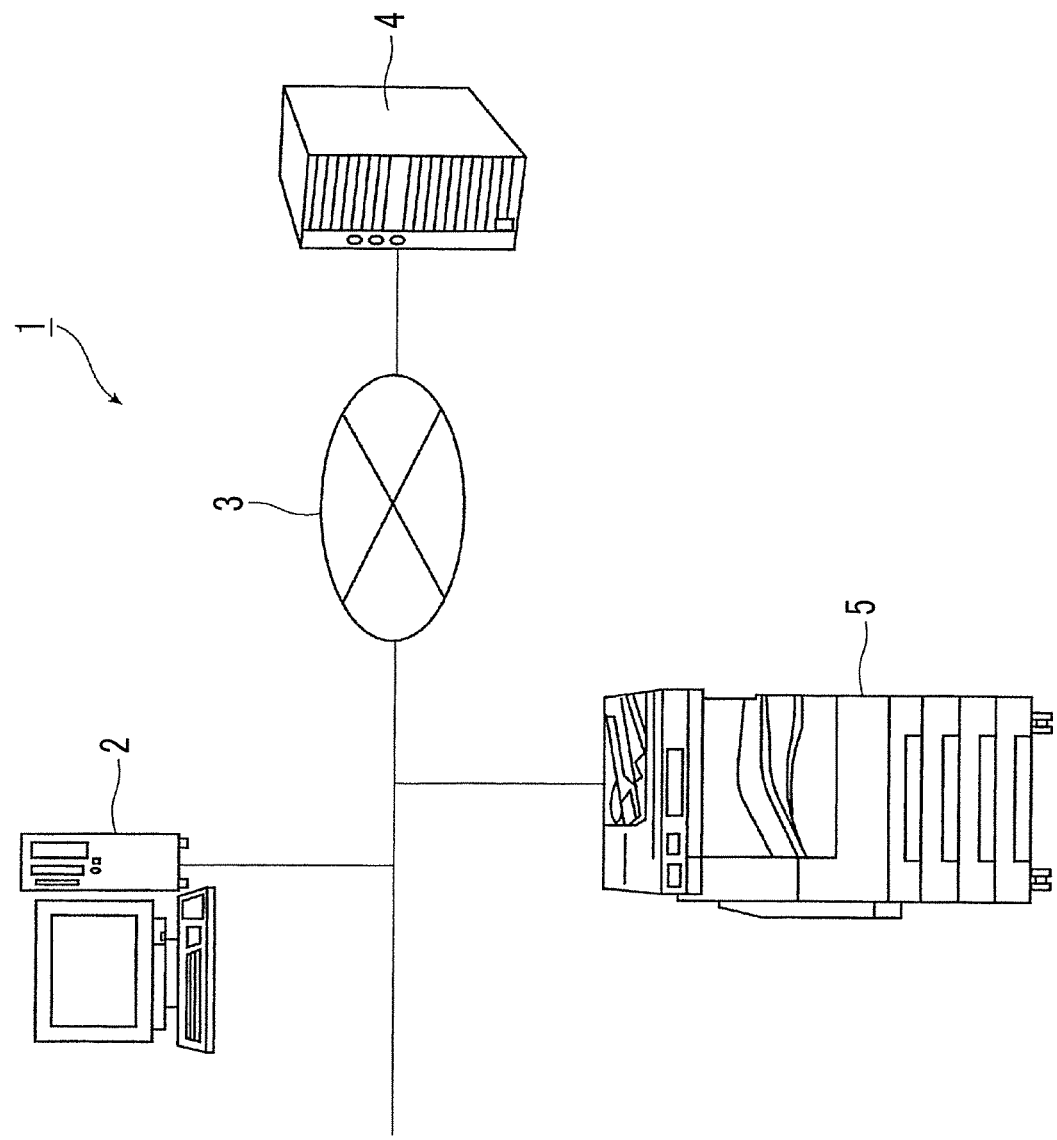
FIG. 1 is an overall configuration diagram showing a 3D model evaluation system according to Exemplary Embodiment 1 of the present invention.

FIG. 1 is a configuration diagram showing a 3D model evaluation system according to Exemplary Embodiment 1.

Overall Configuration of 3D Model Evaluation System

As shown in FIG. 1, the 3D model evaluation system 1 includes a user terminal device 2 which is used by a designer who designs a drawing target using 3D CAD, a server device 4 to which the user terminal device 2 is connected through a network 3 and which executes a 3D model evaluation program or the like, and an image forming apparatus 5 which prints image information as necessary.

In addition, the user terminal device 2 is not limited to a user terminal device 2 connected to the server device 4 through the network 3. However, a 3D model evaluation program including 3D CAD may be installed in the user terminal device 2 itself, and only the user terminal device 2 may constitute the 3D model evaluation system 1.

The user terminal device 2 is configured as, for example, a personal computer. However, the user terminal device 2 is not limited to a personal computer, but may be a tablet terminal device or the like having a function as a personal computer.

Figure 2:
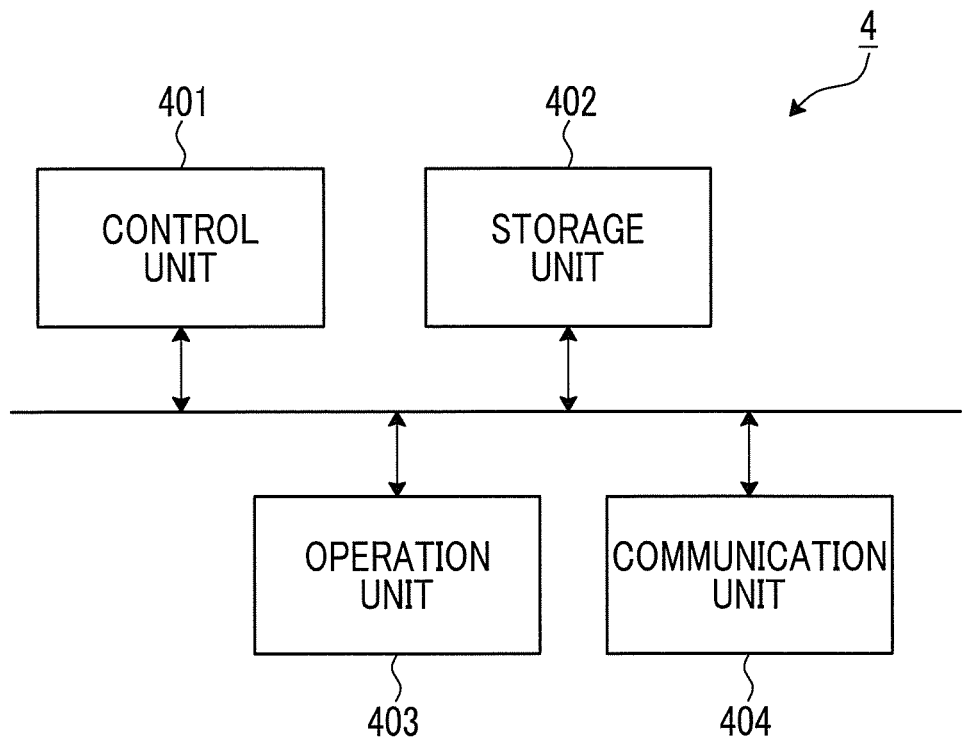
FIG. 2 is a block diagram showing a server device of the 3D model evaluation system according to Exemplary Embodiment 1 of the present invention.

FIG. 2 is a block diagram showing the server device 4 to which the 3D model evaluation system 1 according to Exemplary Embodiment 1 is applied.

As shown in FIG. 2, the server device 4 includes a control unit 401 as an example of the control means, a storage unit 402, an operation unit 403, and a communication unit 404.

The control unit 401 has a central processing unit (CPU), a read only memory (ROM), and a random access memory (RAM). The control unit 401 executes reading and loading of a database formed of a plurality of 3D CAD data created by a 3D CAD program stored in the storage unit 402 formed of a hard disk or the like, an evaluation program for evaluating a 3D model, and the like. The control unit 401 controls the storage unit 402, the operation unit 403, or the communication unit 404, and is connected to the user terminal device 2 and the image forming apparatus 5 through the communication unit 404 and the network 3.

Figure 3:
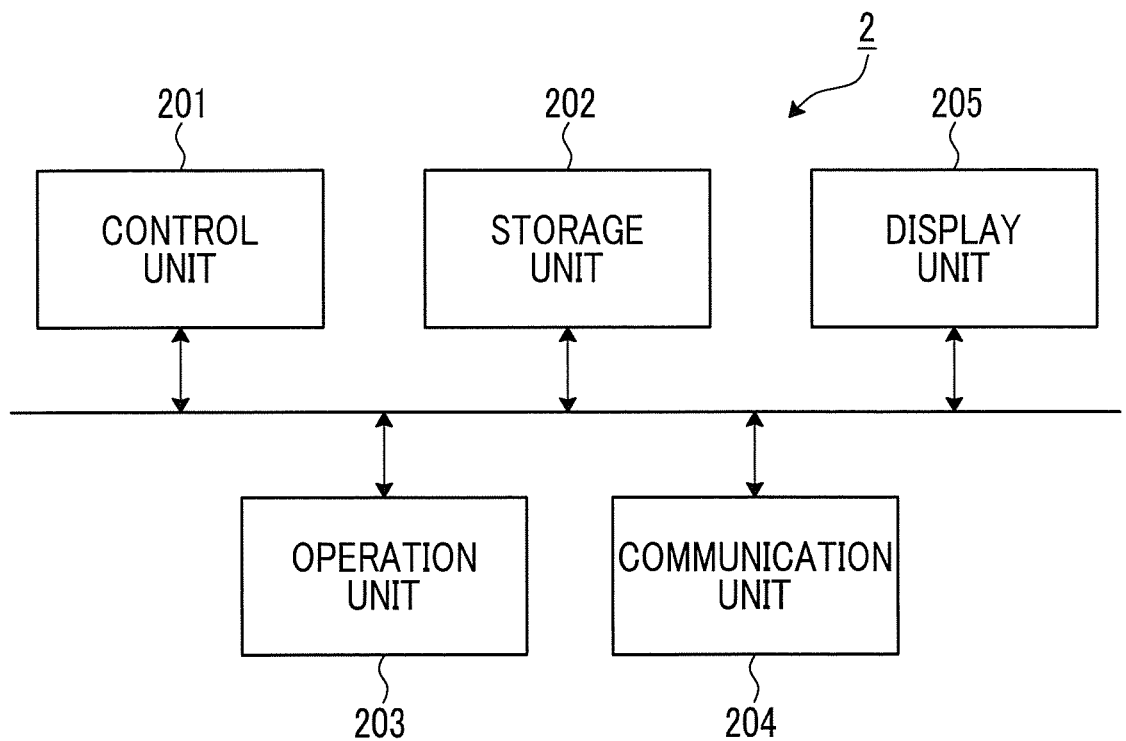
FIG. 3 is a block diagram showing a user terminal device of the 3D model evaluation system according to Exemplary Embodiment 1 of the present invention.

FIG. 3 is a block diagram showing a user terminal device in the 3D model evaluation system 1 according to Exemplary Embodiment 1.

As shown in FIG. 3, the user terminal device 2 includes a control unit 201 as an example of the control means, a storage unit 202, an operation unit 203, a communication unit 204, and a display unit 205.

The control unit 201 has a central processing unit (CPU), a read only memory (ROM), and a random access memory (RAM). The control unit 201 executes a 3D CAD program or an evaluation program for evaluating a 3D model, which is read from the server device 4 or stored in advance in a storage unit 202 formed of a hard disk or the like. The control unit 201 controls the storage unit 202, the operation unit 203, the communication unit 204, or the display unit 205, and transmits and receives data to and from the server device 4 and the image forming apparatus 5 through the communication unit 204.

Figure 4:
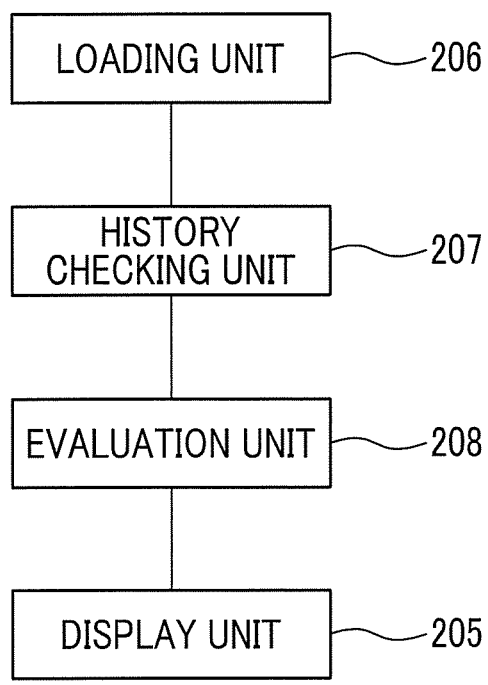
FIG. 4 is a block diagram showing a relevant part of the 3D model evaluation system according to Exemplary Embodiment 1 of the present invention.

As shown in FIG. 4, the control unit 201 executes a 3D model evaluation program so as to function as: a loading unit 206 that loads 3D model data created by 3D CAD; a history checking unit 207 that checks the creation history which is added to the 3D model data loaded by the loading unit 206 and which is obtained in a case where the 3D model data is created by the 3D CAD, and an evaluation unit 208 that evaluates a degree of coincidence between the creation history of the 3D model data checked by the history checking unit 207 and a predetermined rule. The predetermined rule indicates a rule for building a 3D model in a modifiable manner. For example, the rule includes: creating a base layout that determines the base of the entire design shape at the beginning of the history; not writing on the base layout but making the base layout remain as schematic shape and creating a function-based layout for each function at each functional level, in a case of parts whose shapes are divided by functions; not directly using the base layout or the function-based layout but converting necessary sketch elements into entities and using the entities as another sketch, in a case of feature sketch used when creating the 3D model shape for implementation; and the like.

Loading Unit 206

The loading unit 206 loads the 3D model data specified by the operation unit 203 of the user terminal device 2 operated by a designer from the database designed by the designer and stored in the storage unit 402 of the server device 4. The operation of loading the 3D model data is executed by, for example, accessing a database stored in the storage unit 402 of the server device 4 during execution of the 3D CAD program and specifying the 3D model data stored in the database by a name or the like.

History Checking Unit 207

The history checking unit 207 performs an operation of checking the creation history which is added to the 3D model data loaded by the loading unit and which is obtained in a case where the 3D model data is created by the 3D CAD, in accordance with the 3D model evaluation program.

Evaluation Unit 208

The evaluation unit 208 performs an operation of evaluating the degree of coincidence between the creation history of the 3D model data checked by the history checking unit 207 and a predetermined rule in accordance with the 3D model evaluation program.

The operation of the 3D model evaluation program executed by the control unit 201 of the user terminal device 2 will be described later in detail.

Design of 3D Model

Prior to the evaluation of 3D model data using the 3D model evaluation system 1, a procedure of designing a gear case by 3D CAD as an example of a 3D model will be described.

The gear case to be designed has the following configuration.

Figure 5:
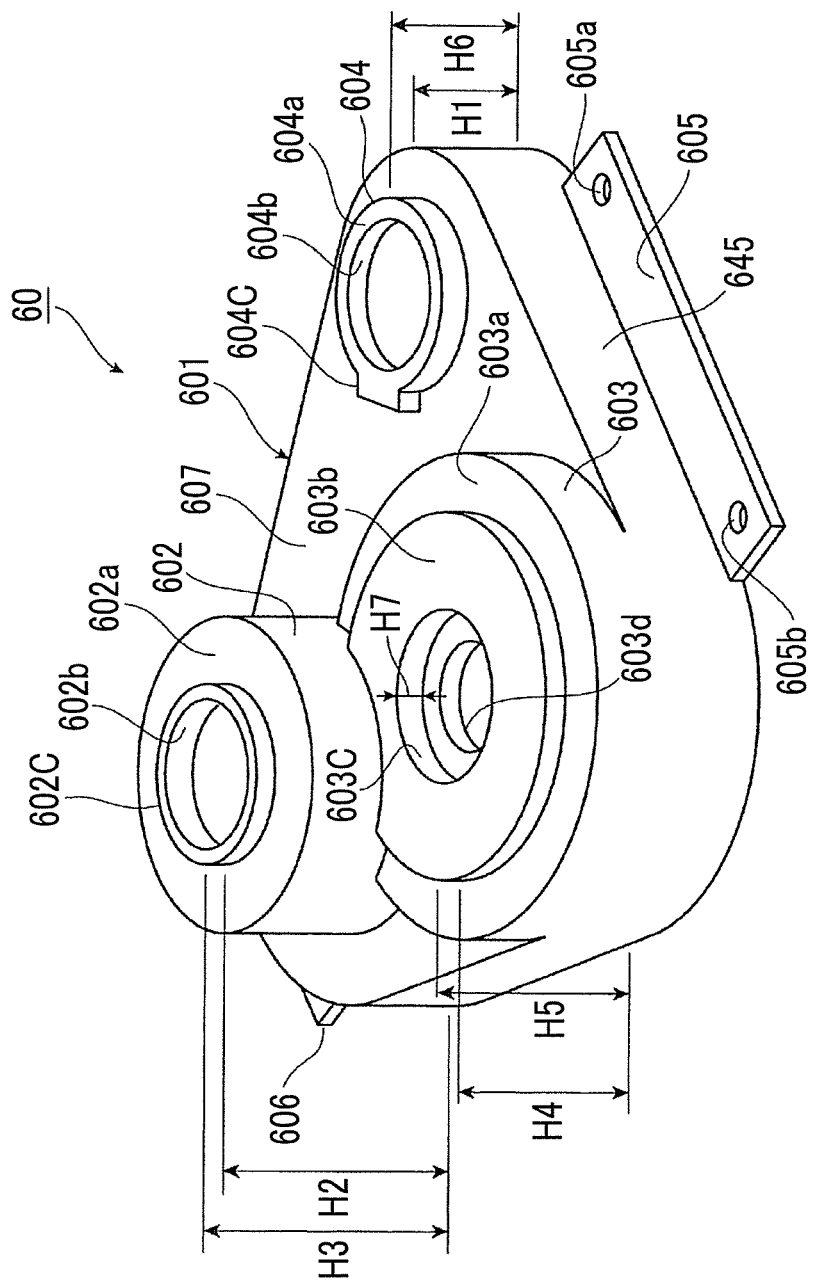
FIG. 5 is a perspective configuration diagram showing a gear case.
Figure 6:
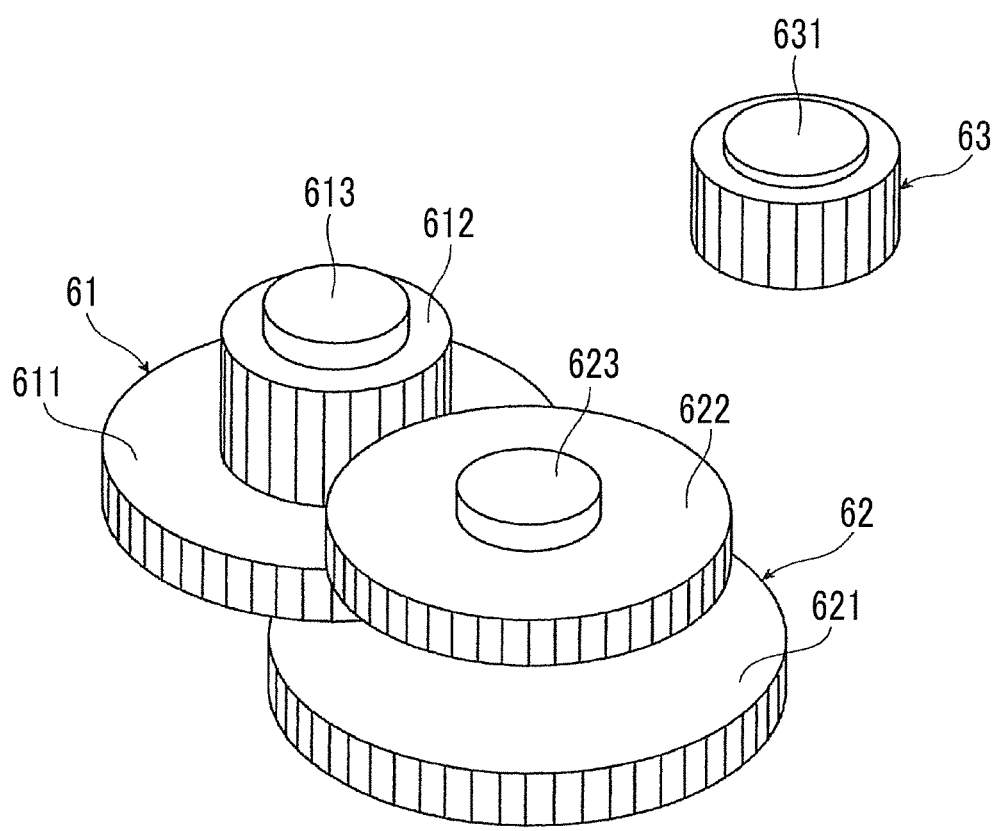
FIG. 6 is a perspective configuration diagram showing a gear housed in the gear case.

As shown in FIG. 5, the gear case 60 is formed, for example, through integral molding using a synthetic resin. As shown in FIG. 6, the gear case 60 houses parts such that the parts are rotatable at a predetermined position. The parts include, for example, 1st to 3rd gears 61 to 63 as an example of a plurality (three in the shown example) of driving force transmitting means for transmitting a rotational driving force.

The 1st gear 61 is a two-stage gear. The two-stage gear includes: a 1st large-diameter portion 611 that is formed of a spur gear or the like of which the outer diameter is set relatively large and which has a necessary outer diameter and the necessary number of teeth; a 1st small-diameter portion 612 that is formed integrally with the 1st large-diameter portion 611 so as to be coaxial therewith and that is formed of a spur gear or the like having a necessary outer diameter, which is set to have a smaller outer diameter than the 1st large-diameter portion 611, and the necessary number of teeth; and a 1st rotation shaft 613 that is formed integrally with or separately from the 1st large-diameter portion 611 and the 1st small-diameter portion 612. The 2nd gear 62 is disposed at a position separated from the center of the 1st gear 61 by a predetermined distance. Similarly to the 1st gear 61, the 2nd gear 62 is a two-stage gear. The two-stage gear includes: a 2nd large-diameter portion 621 that is formed of a spur gear or the like of which the outer diameter is set relatively large and which has a necessary outer diameter and the necessary number of teeth; a 2nd small-diameter portion 622 that is fixed to be coaxial with the 2nd large-diameter portion 621 in a state where the portions are vertically separated from each other along the vertical direction Z and that is formed of a spur gear or the like having a necessary outer diameter, which is set to have a smaller outer diameter than the 2nd large-diameter portion 621, and the necessary number of teeth; and a 2nd rotation shaft 623 that is formed integrally with or separately from the 2nd large-diameter portion 621 and the 2nd small-diameter portion 622. The 2nd small-diameter portion 622 of the 2nd gear 62 is engaged with the 1st small-diameter portion 612 of the 1st gear 61 so as to transmit the rotational driving force. The 3rd gear 63 is disposed at a predetermined position separated from the 1st and 2nd gears 61 and 62. The 3rd gear 63 is a single-stage gear of which the outer diameter is set smaller than the outer diameters of the 1st and 2nd large-diameter portions 611 and 621 of the 1st and 2nd gears 61 and 62. The 3rd gear 63 has a 3rd rotation shaft 631 formed integrally with or separate from the 3rd gear 63.

As shown in FIG. 5, the gear case 60 includes: a gear case body 601 that houses the 1st to 3rd gears 61 to 63 in a state of covering a planar outer peripheral shape; a 1st housing portion 602 that is provided so as to protrude upward along the vertical direction Z to the upper end surface of the gear case body 601 and that houses the 1st small-diameter portion 612 of the 1st gear 61; a 2nd housing portion 603 that is provided so as to protrude upward along the vertical direction Z to the upper end surface of the gear case body 601 and that houses the 2nd small-diameter portion 622 of the 2nd gear 62; a 3rd housing portion 604 that is provided so as to protrude upward along the vertical direction Z to the upper end surface of the gear case body 601 and that rotatably supports and houses the 3rd rotation shaft 631 of the 3rd gear 63; a 1st mounting portion 605 that is provided so as to protrude in a planar rectangular shape toward the side of the gear case body 601; and a 2nd mounting portion 606 that is provided so as to protrude in a planar rectangular shape toward the side of the gear case body 601 at a position facing the 1st mounting portion 605.

Figure 7:
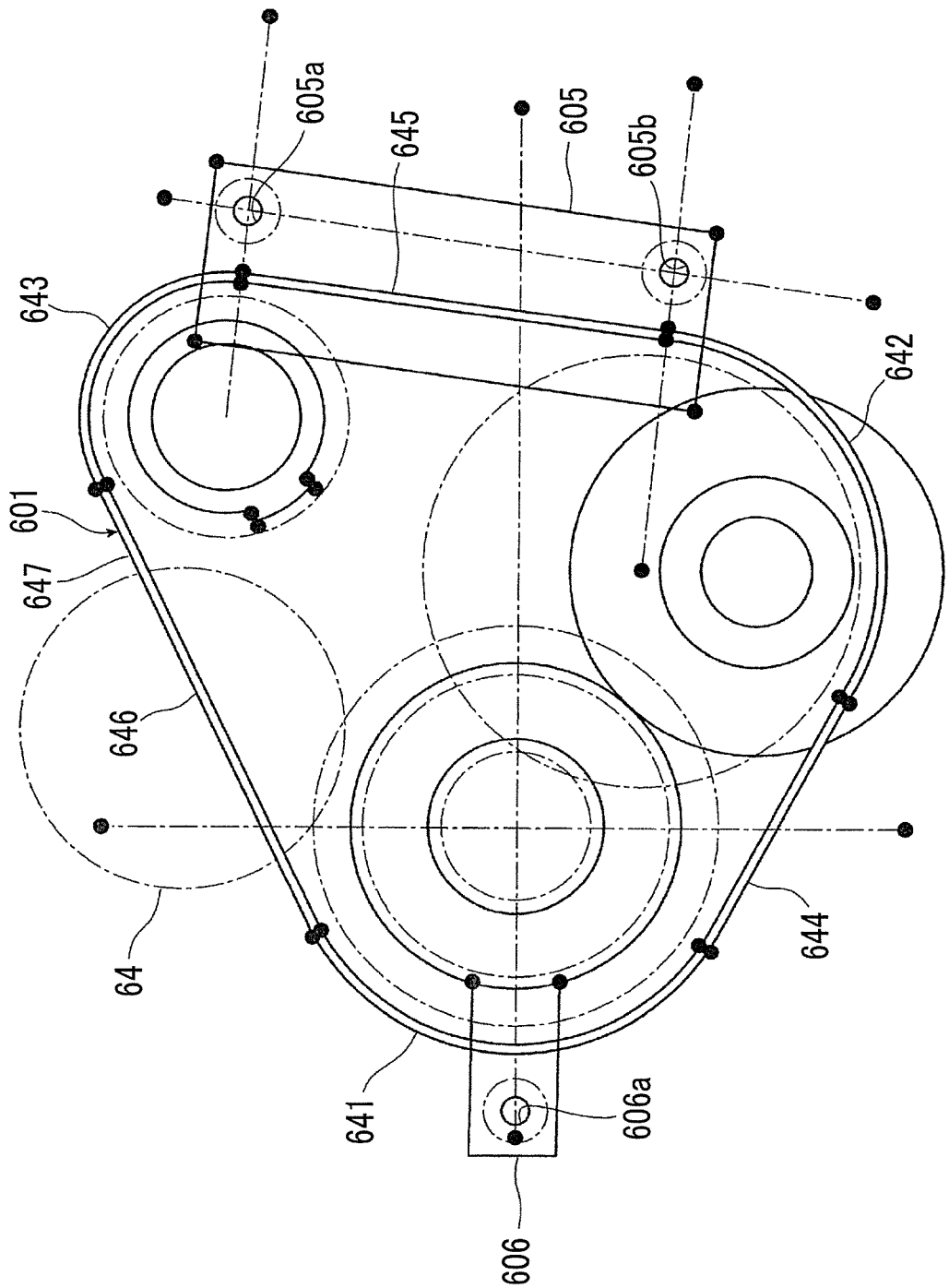
FIG. 7 is a planar configuration diagram showing a relevant part of the gear case.

As shown in FIG. 7, the gear case body 601 is formed in a hollow box shape which is substantially triangular in plane and which has a predetermined height H1 (refer to FIG. 5) such that a 1st large-diameter portion 611 of the 1st gear 61, a 2nd large-diameter portion 621 of the 2nd gear 62, and a 3rd gear 63 are respectively positioned at three vertexes. The entire bottom surface of the gear case body 601 is open. The entire upper end surface of the gear case body 601 is closed by an upper end surface 607. The gear case body 601 has, on the outer peripheral surface thereof: a 1st curved portion 641 which is disposed to be curved in an arc shape (fan shape) at a position corresponding to the 1st large-diameter portion 611 of the 1st gear 61; a 2nd curved portion 642 which is disposed to be curved in an arc shape at the position corresponding to the 2nd large-diameter portion 621 of the 2nd gear 62; a 3rd curved portion 643 which is disposed to be curved in an arc shape at the position corresponding to the outer peripheral surface of the 3rd gear 63; a 1st planar portion 644 which connects the 1st curved portion 641 and the 2nd curved portion 642 in a plane; a 2nd planar portion 645 which connects the 2nd curved portion 642 and the 3rd curved portion 643 in a plane; and a 3rd planar portion 646 which connects the 3rd curved portion 643 and the 1st curved portion 641 in a plane.

In FIG. 7, the reference numeral 64 denotes an intermediate gear which engages the 1st large-diameter portion 611 of the 1st gear 61 with the 3rd gear 63. The 3rd planar portion 646 of the gear case body 601 is provided with an escape portion 647 which is cut out such that the intermediate gear 64 can be rotatably inserted.

As shown in FIG. 5, the 1st housing portion 602 is formed in a cylindrical shape protruding upward along the vertical direction Z by a predetermined height H2 with respect to the bottom surface (reference plane) of the gear case body 601. The upper end surface 602a of the 1st housing portion 602 is closed. A 1st shaft support portion 602b that rotatably supports the 1st rotation shaft 613 of the 1st gear 61 is opened in a circular shape on the upper end surface 602a of the 1st housing portion 602. A cylindrical 1st flange portion 602c is provided on the outer periphery of the 1st shaft support portion 602b so as to be relatively short and protrude upward along the vertical direction Z. The 1st flange portion 602c protrudes upward from the bottom surface (reference plane) of the gear case body 601 by a predetermined height H3. It should be noted that the 1st housing portion 602 may be defined by a height (H2–H1) with respect to the upper end surface 607 of the gear case body 601 instead of the height H2 with respect to the bottom surface (reference plane) of the gear case body 601. Further, the 1st flange portion 602c may be defined by a height (H3–H1) with respect to the upper end surface 607 of the gear case body 601 instead of the height H3 with respect to the bottom surface (reference plane) of the gear case body 601.

The 2nd housing portion 603 is formed in a cylindrical shape protruding upward along the vertical direction Z by a predetermined height H4 lower than the height of the 1st housing portion 602 with respect to the bottom surface of the gear case body 601. The upper end surface 603a of the 2nd housing portion 603 is closed. On the upper end surface 603a of the 2nd housing portion 603, a 2nd shaft support portion 603b rotatably supporting the 2nd rotation shaft 623 of the 2nd gear 62 is formed in a cylindrical shape protruding upward along the vertical direction Z by a predetermined height H5. At the center of the 2nd shaft support portion 603b, a 2nd flange portion 603c having a cylindrical shape is provided so as to be recessed downward along the vertical direction Z by a relatively short predetermined height H7. The bottom surface of the 2nd flange portion 603c is closed, and a support hole 603d that rotatably supports the 2nd rotation shaft 623 of the 2nd gear 62 is opened at the center thereof. It should be noted that the 2nd housing portion 603 may be defined by a height (H4–H1) with respect to the upper end surface 607 of the gear case body 601 instead of the height H4 with respect to the bottom surface (reference plane) of the gear case body 601. Further, the 2nd shaft support portion 603b may be defined by the height (H5–H1) with respect to the upper end surface 607 of the gear case body 601 instead of the height H5 with respect to the bottom surface (reference plane) of the gear case body 601.

The 3rd housing portion 604 is formed in a cylindrical shape protruding upward from the bottom surface of the gear case body 601 by a predetermined height H6 lower than the height of the 2nd housing portion 603. A 3rd shaft support portion 604b that rotatably supports the 3rd rotation shaft 631 of the 3rd gear 63 is opened on the upper end surface 604a of the 3rd housing portion 604. A protruding portion 604c protruding toward the 1st housing portion 602 is provided on the outer periphery of the 3rd shaft support portion 604b. It should be noted that the 3rd housing portion 604 may be defined by a height (H6−H1) with respect to the upper end surface 607 of the gear case body 601 instead of the height H6 with respect to the bottom surface (reference plane) of the gear case body 601.

The 1st mounting portion 605 is formed in an elongated planar rectangular plate shape having a necessary thickness and protruding outward from the 2nd planar portion 645 of the gear case body 601. Mounting holes 605a and 605b for mounting the gear case 60 at necessary mounting positions by screwing or the like are opened at both ends along the longitudinal direction of the 1st mounting portion 605, respectively.

As shown in FIG. 7, the 2nd mounting portion 606 is formed in a planar rectangular plate shape having a necessary thickness and protruding outward from the 1st curved portion 641 of the gear case body 601. A mounting hole 606a for mounting the gear case 60 at a necessary mounting position by screwing or the like is opened in the 2nd mounting portion 606. In FIG. 7, for convenience, the 1st and 2nd mounting portions 605 and 606 are shown as being extended to the inside of the gear case body 601, but the 1st and 2nd mounting portions 605 and 606 are provided only outside the gear case body 601.

Design of Gear Case

The gear case 60 as an example of the 3D model configured as described above is designed using 3D CAD as follows. Various 3D CADs can be used and are not particularly limited. In Exemplary Embodiment 1, "SOLID-WORKS" which is software of 3D CAD of SOLIDWORKS (registered trademark) is used as 3D CAD.

The 3D CAD software (program) is executed, for example, by reading from the server device 4 to the user terminal device 2 through the network 3. In addition, the processing is executed by installing 3D CAD software (program) in the storage unit 202 of the user terminal device 2 in advance.

First, in a case of designing the gear case 60 using the 3D CAD software, a base layout is examined in advance in 2-Dimensions (2D) through an examination of a shape of the gear case 60. Here, the base layout indicates a layout that the gear case 60 to be designed should have at least. That is, in a case of starting the design using the 3D CAD software, a base layout diagram that determines the overall design shape is created as the top design history. The base layout diagram is the simplest and major element.

Figure 8:
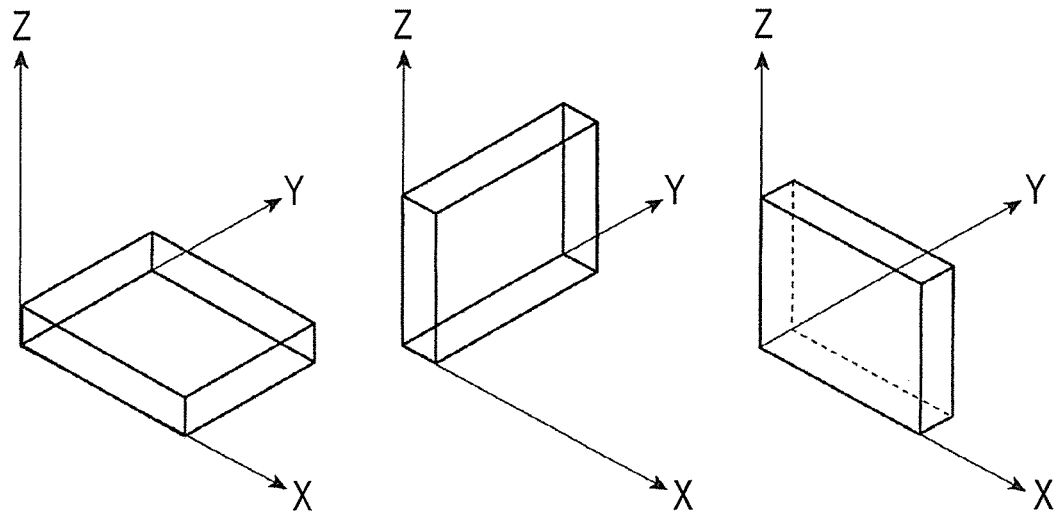
FIG. 8 is an explanatory diagram showing a sketch plane of 3D CAD.

In creating a base layout diagram, in order to create a 2D sketch in a 3D space using 3D CAD software, as shown in FIG. 8, a sketch plane indicating which plane to draw on is specified among the XY plane, YZ plane, and ZX plane in the 3D space. In an extruded feature for extruding a solid from a sketch, the sketch plane is the reference plane for the solid. Therefore, the sketch plane of the first feature defines the orientation of the part in 3D coordinates. Here, in consideration of the shape of the gear case 60, the XY plane is used as a sketch plane (the reference plane for the solid) in a case of creating a 2D sketch.

In designing the gear case 60, as a base design concept, the outer diameters of the 1st to 3rd gears 61 to 63 housed in the gear case 60 and the arrangement of the 1st to 3rd gears 61 to 63 are selected.

Figure 9:
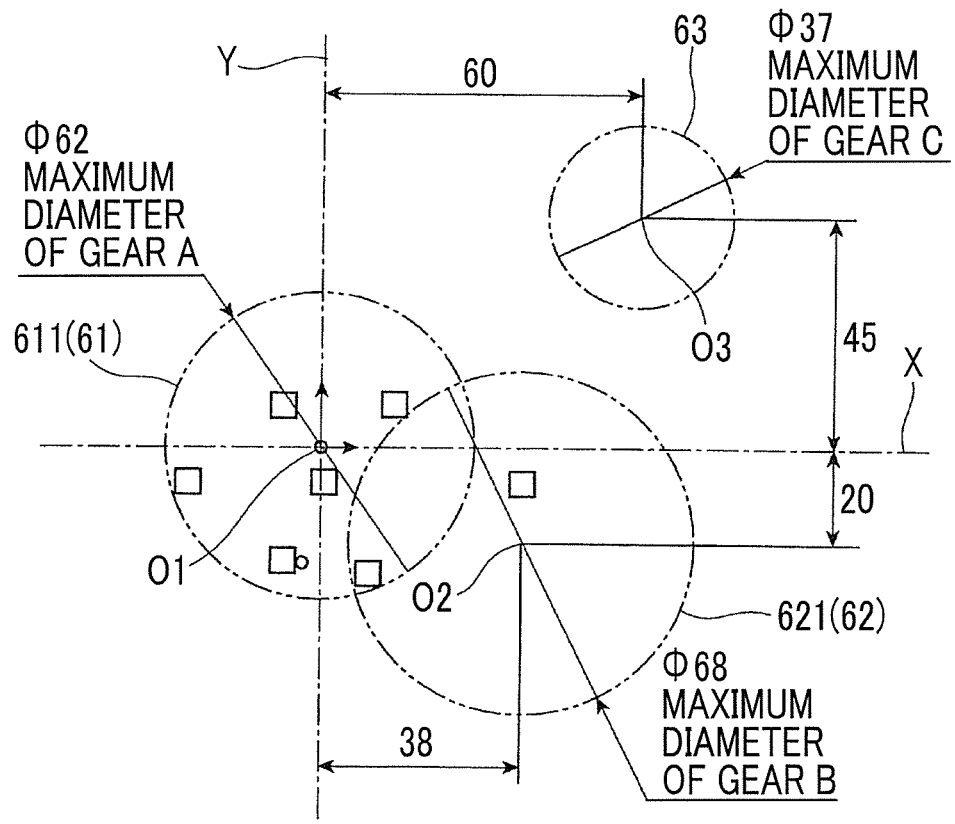
FIG. 9 is a configuration diagram showing a base layout of the gear case.

In Exemplary Embodiment 1, as shown in FIG. 9, as a base layout diagram, the outer diameter (tooth circle) of the 1st large-diameter portion 611 of the 1st gear 61 is set to φ62 mm, and the outer diameter (gear diameter) of the 2nd large-diameter portion 621 of the 2nd gear 62 is set to φ68 mm, and the outer diameter (gear diameter) of the 3rd gear 63 is set to φ37 mm. Regarding arrangement of the 1st to 3rd gears 61 to 63, in a case where the center O1 of the 1st gear 61 is the origin of the XY plane serving as a sketch plane, the center O2 of the 2nd gear 62 is set at a position where the X coordinate is +38 mm and the Y coordinate is −20 mm with respect to the center O1 of the 1st gear 61, and the center O3 of the 3rd gear 63 is set at a position where the X coordinate is +60 mm and the Y coordinate is +45 mm with respect to the center O1 of the 1st gear 61.

In a case of the 3D CAD software, a base layout diagram showing the outer diameters of the 1st to 3rd gears 61 to 63 housed in the gear case 60 and the arrangement of the 1st to 3rd gears 61 to 63 is shown in FIG. 9. The 1st large-diameter portion 611 of the 1st gear 61 is sketched (plotted) as a circle with a diameter of 68 mm indicating the 1st large-diameter portion 611 of the 1st gear 61, in a case where the center thereof is set at the origin O1 of the XY coordinates. The 2nd large-diameter portion 621 of the 2nd gear 62 is sketched as a circle having a diameter of 68 mm indicating the 2nd large-diameter portion 621 of the 2nd gear 62, in a case where the center thereof is set at the point O2 at the position where the X coordinate is +38 mm and the Y coordinate is −20 mm with respect to the origin O1 of the XY coordinates. The 3rd gear 63 is sketched as a circle with a diameter of 37 mm indicating the 3rd gear 63 in a case where the center thereof is set at a point at a position where the X coordinate is +38 mm and the Y coordinate is −20 mm with respect to the origin O1 of the XY coordinates.

As described above, the circles indicating the 1st to 3rd gears 61 to 63 are completely defined by sufficiently providing information on the shape, size, and position of the sketch. Here, complete definition refers to defining a shape by giving information such as dimensions and geometric constraints to a figure.

In a sketch, it is not necessary to draw lines with the correct sizes. In a case where a dimensional constraint indicating dimensions and a geometric constraint indicating the orthogonal state of XY coordinates are given to the line after the sketch is created, the 3D CAD performs calculation such that the positions and sizes of the lines are changed to be correct positions and sizes, and the lines are shown on the display unit 205 of the user terminal device 2. The dimensional constraint is a dimension created by sketching, and the dimensional numerical value is stored as a variable in the 3D CAD program, and is reflected in the shape in a case where the value of the variable is changed.

More specifically, in a case where the outer diameters and arrangement of the 1st to 3rd gears 61 to 63 are changed by changing the design of the gear case 60, it is possible to easily deal with the changes in design by changing the dimensional values shown in FIG. 9. Changes in dimensions and shapes made in the base layout diagram are directly reflected in sketches, features, and the like executed thereafter.

Figure 10:
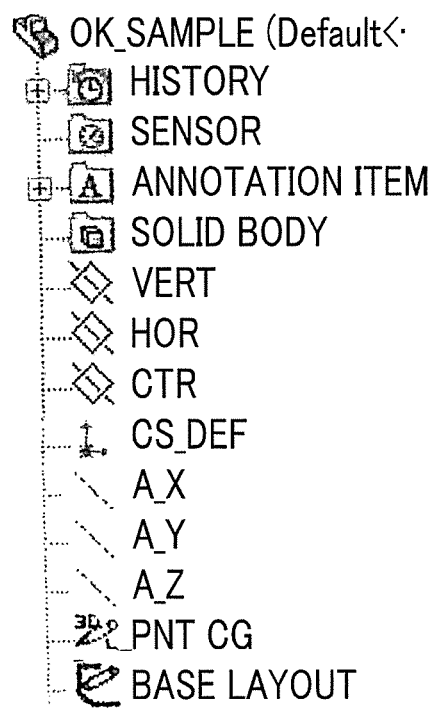
FIG. 10 is an explanatory diagram showing an operation history of 3D CAD.

FIG. 10 is a diagram showing a creation history of a base layout diagram which is a basis for designing the gear case 60 using 3D CAD. The creation history is shown in a tree shape together with the base layout diagram on the display unit 205 of the user terminal device 2.

In FIG. 10, a base layout diagram is created as a sketch named "BASE LAYOUT".

Next, the designer creates a function-based layout diagram on the basis of the base layout diagram using 3D CAD.

Figure 11:
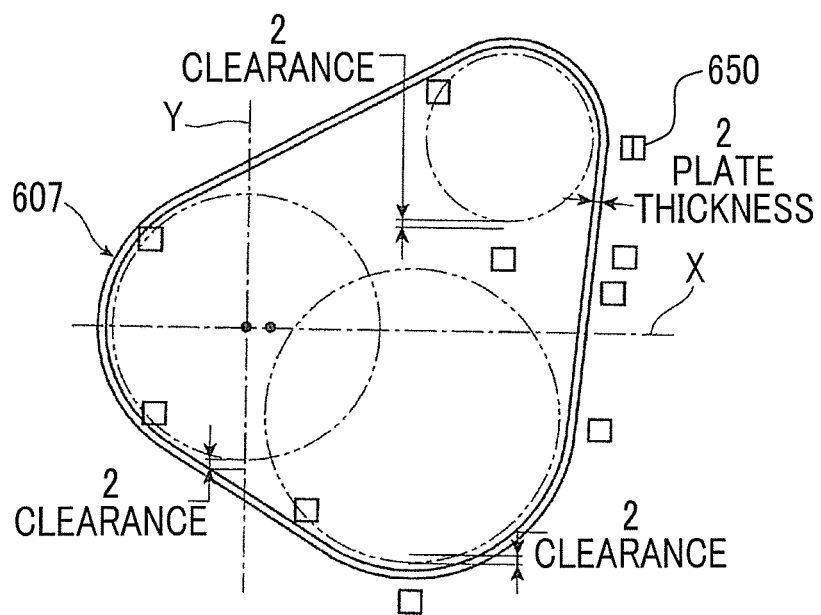
FIG. 11 is an explanatory diagram showing a design process of the gear case using 3D CAD.
Figure 12:
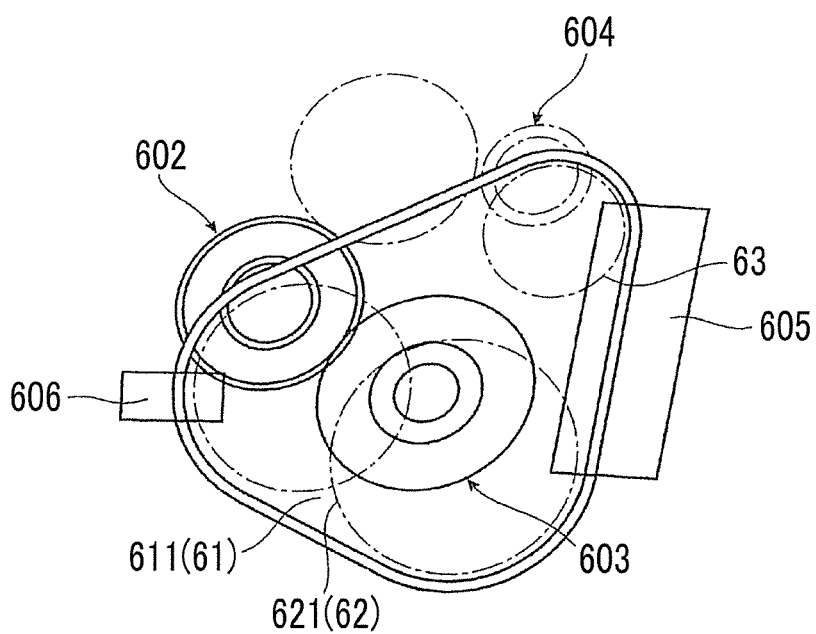
FIG. 12 is an explanatory diagram showing a design process of the gear case using 3D CAD.

In a case of designing the gear case 60, as shown in FIG. 11 and FIG. 12, examples of function-based layout diagrams include layout diagrams indicating the outer and inner peripheral shapes of the gear case body 601, the shape of the 1st housing portion 602, the shape of the 2nd housing portion 603, the shape of the 3rd housing portion 604, and the shapes of the 1st mounting portion 605 and the 2nd mounting portion 606. In FIG. 11, reference numeral 650 indicates a command indicating the type of line.

In the gear case body 601, as shown in FIG. 11, the 1st to 3rd curved portions 641 to 643 arranged on the outer periphery of the 1st to 3rd gears 61 to 63 are arranged with a gap of 2 mm with respect to the outer diameters of the 1st to 3rd gears 61 to 63. That is, the inner peripheral surfaces of the 1st to 3rd curved portions 641 to 643 are sketched (shown) as arcs obtained by adding 2 mm to the outer diameters of the 1st to 3rd gears 61 to 63. The thickness of the gear case body 601 is set to 2 mm. That is, the outer peripheral surfaces of the 1st to 3rd curved portions 641 to 643 are sketched (shown) as arcs obtained by adding 4 mm (=2+2) to the outer diameters of the 1st to 3rd gears 61 to 63. In the gear case body 601, the 1st to 3rd curved portions 641 to 643 are connected to each other by 1st to 3rd planar portions 644 to 646 having a thickness of 2 mm.

In such a manner, a function-based layout diagram of the gear case body 601 is sketched and created. At this time, the bottom surface of the gear case body 601 is set as the end surface of the base appearance. That is, the bottom surface of the gear case body 601 is set as the reference plane.

Similarly, as shown in FIG. 12, the upper end surface 602a of the 1st housing portion 602 and the upper end surface 603a of the 2nd housing portion 603 are sketched as circles having a predetermined height with respect to a reference plane.

Figure 13:
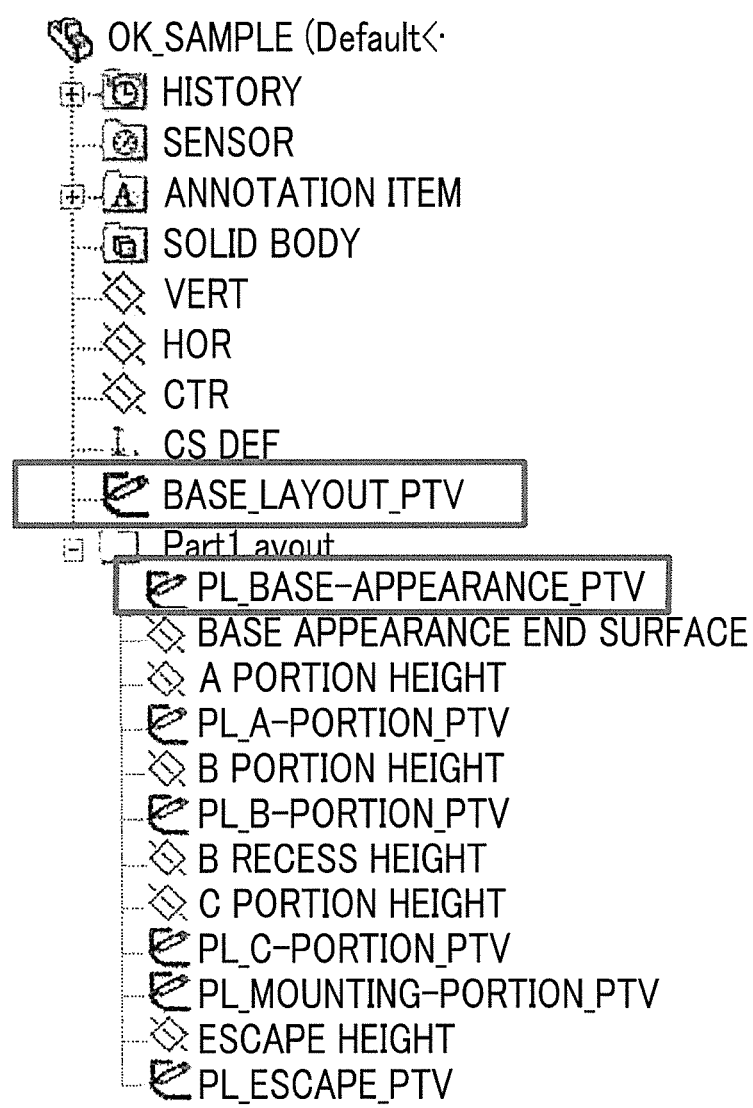
FIG. 13 is an explanatory diagram showing an operation history of 3D CAD.

Then, on the basis of the base layout diagram using 3D CAD, as shown in FIG. 13, a designer creates a function-based layout diagram of the gear case body 601 with a sketch named "PL_Base-Outer-Diameter_PTV" in the tree of PART LAYOUT. The designer creates a function-based layout diagram of the 1st housing portion 602 with a sketch named "PL_A-Portion_PTV". The designer creates a function-based layout diagram of the 2nd housing portion 603 with a sketch named "PL_B-Portion_PTV". The designer creates a function-based layout diagram of the 3rd housing portion 604 with a sketch named "PL_C-Portion_PTV". The designer creates function-based layout diagrams of the 1st and 2nd mounting portions 605 and 606 with a sketch named "PL_Mounting-Portion_PTV". The designer creates a function-based layout diagram of the escape portion 647 (refer to FIG. 7) with a sketch named "PL_Escape_PTV".

In such a manner, on the basis of the base layout diagram using 3D CAD, function-based layout diagrams are created. The function-based layout diagrams indicate the outer and inner peripheral shapes of the gear case body 601, the shape of the 1st housing portion 602, the shape of the 2nd housing portion 603, the shape of the 3rd housing portion 604, the shapes of the 1st mounting portion 605 and the 2nd mounting portion 606, and the shape of the escape portion 647.

Then, on the basis of the function-based layout diagram using the 3D CAD, the designer performs three-dimensional designs of the gear case body 601, the 1st housing portion 602, the 2nd housing portion 603, and the 3rd housing portion 604 as the respective functional portions.

Figure 14:
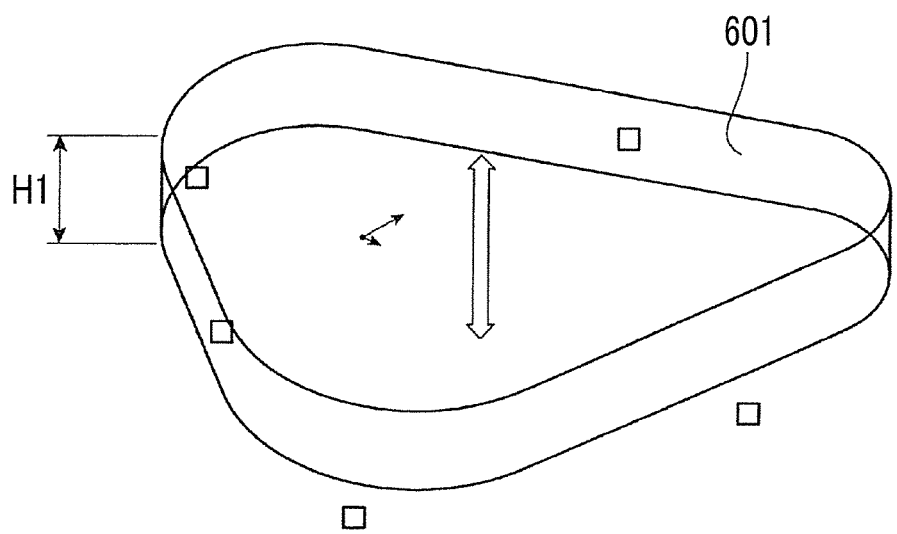
FIG. 14 is a perspective configuration diagram showing a design process of the gear case using 3D CAD.
Figure 15:
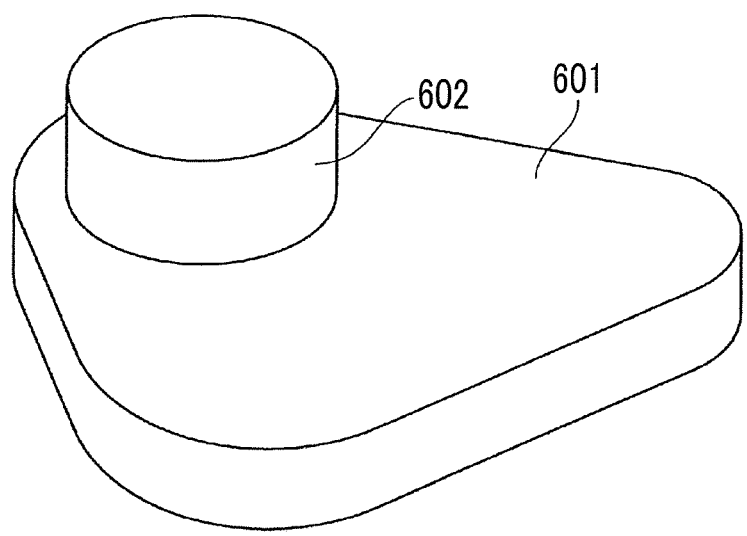
FIG. 15 is a perspective configuration diagram showing a design process of the gear case using 3D CAD.
Figure 16:
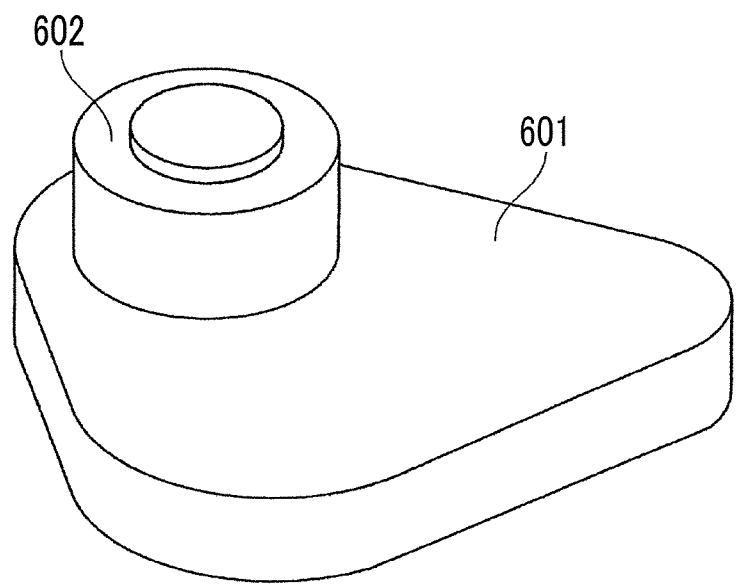
FIG. 16 is a perspective configuration diagram showing a design process of the gear case using 3D CAD.
Figure 17:
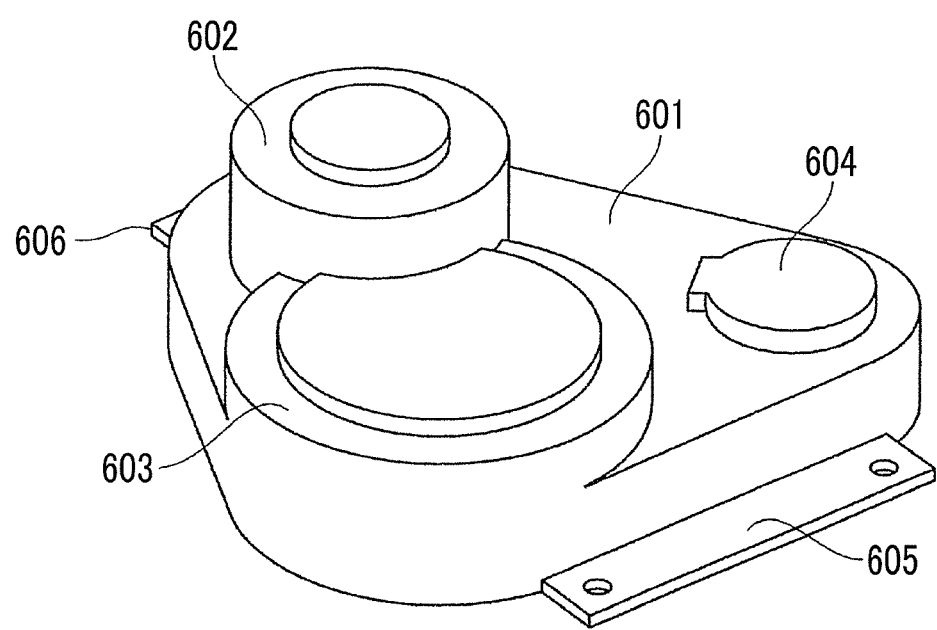
FIG. 17 is a perspective configuration diagram showing a design process of the gear case using 3D CAD.

In performing the three-dimensional design of the gear case body 601, as shown in FIG. 14, on the basis of a function-based layout diagram, a feature (Extrude) operation for extruding by the predetermined height H1 is executed on the basis of a sketch (refer to FIG. 11) showing the appearance of the gear case body 601. Thereby, a three-dimensional shape of the gear case body 601 is designed.

Figure 18:
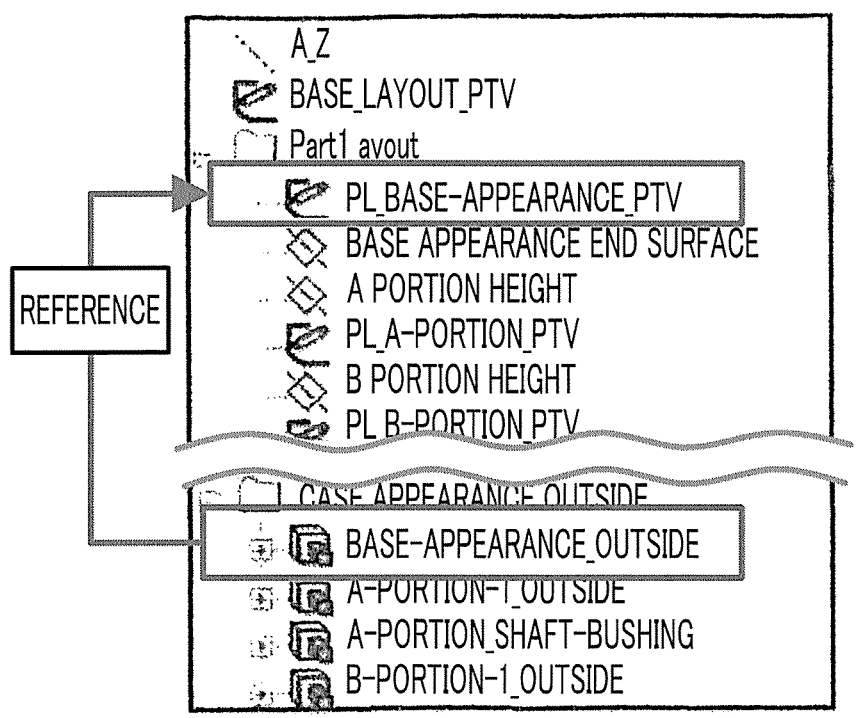
FIG. 18 is an explanatory diagram showing an operation history of 3D CAD.

At this time, in designing the three-dimensional shape of the gear case body 601, as shown in FIG. 18, the sketch named "PL_Base-Appearance_PTV", which is a sketch showing the appearance of the gear case body 601, is not directly used, and the extrude feature (Extrude) operation named "Base-Appearance_Outside" is executed with reference to the sketch named "PL_Base-Appearance_PTV".

As described above, in a case of executing the extrude feature (Extrude) operation on the basis of the sketch indicating the appearance of the gear case body 601, the sketch "PL_Base-Appearance_PTV" indicating the appearance of the gear case body 601 is not directly used, and the extrude feature (Extrude) operation is executed with reference to the sketch "PL_Base-Appearance_PTV". Thereby, the sketch "PL_Base-Appearance_PTV" indicating the original appearance of the gear case body 601 remains on the tree indicating the history, and a new extrude feature (Extrude) operation named "Base-Appearance_Outside" is executed.

Thereafter, in a similar manner, after referring to sketches "PL_A-Portion_PTV", "PL_B-Portion_PTV", "PL_C-Portion_PTV", "PL_Mounting-Portion_PTV", and "PL_Escape_PTV" indicating the appearances of the 1st housing portion 602, the 2nd housing portion 603, and the like, the extrude feature (Extrude) operation is executed on the basis of the sketches "PL_A-Portion_PTV", "PL_B-Portion_PTV", "PL_C-Portion_PTV", "PL_Mounting-Portion_PTV", and "PL_Escape_PTV". Thereby, as shown in FIG. 18, after referring to the original sketches "PL_A-Portion_PTV", "PL_B-Portion_PTV", "PL_C-Portion_PTV", and "PL_Mounting-Portion_PTV" and "PL_Escape_PTV", the current sketches "PL_A-Portion_PTV", "PL_B-Portion_PTV", "PL_C-Portion_PTV", and "PL_Mounting-Portion_PTV" and "PL_Escape_PTV" remain on the tree indicating the history, and new histories "A-Portion-1_Outside", "A-Portion_Shaft-Bushing", "B-Portion-1_Outside", "B-Portion_Shaft-Bushing" . . . are created.

Through the above processes, the design process of the gear case 60 is completed.

The 3D model data of the gear case 60 created as described above is stored as 3D model data in the database of the storage unit 402 of the server device 4 by operating the operation unit 203 of the user terminal device 2 by the designer.

3D Model Evaluation System

The 3D model evaluation system 1 evaluates the quality of the 3D model of the gear case 60 designed by the designer using 3D CAD as described above.

In the 3D model of the gear case 60 designed by using the 3D CAD as described above, in the future, the shape and dimensions of parts such as the 1st to 3rd gears 61 to 63 or the components of the parts, and the like may be changed due to design changes or the like.

At this time, depending on the design quality of the 3D model, it is difficult to deal with subsequent design changes and the like, and troubles such as unintentional change or deletion of the shape and arrangement of parts during the exchange of 3D model data may occur in terms of product data quality (PDQ: model data quality).

In a case where the model data of the already designed 3D model cannot be effectively used at the time of subsequent design changes and the like, not only a great burden is imposed on other designers who make the design change and the like, but also human resources necessary for creating the model data of the 3D model are unnecessarily wasted and so on. As a result, there is concern about great loss in product environmental assessment.

Therefore, it is necessary for the 3D model evaluation system 1 according to Exemplary Embodiment 1 to easily evaluate the degree of easiness in utilization in a case of utilizing the 3D model data. Thus, the 3D model evaluation system 1 is configured to include: a loading unit that loads the 3D model data created by the 3D CAD; a history checking unit that checks a creation history which is added to the 3D model data loaded by the loading unit and which is obtained in a case where the 3D model data is created by the 3D CAD; and an evaluation unit that evaluates a degree of coincidence between the creation history of the 3D model data checked by the history checking unit and a predetermined rule.

That is, the 3D model evaluation system 1 according to Exemplary Embodiment 1 is, for example, incorporated as an additional function into a 3D CAD program (software) or is created and used as a separate program (software) independent of the 3D CAD program (software). The 3D model evaluation system 1 according to Exemplary Embodiment 1 is incorporated as an additional function into a 3D CAD program (software).

The 3D model evaluation system 1 is configured as a program executed by the control unit 201 of the user terminal device 2 as shown in FIG. 4.

As shown in FIG. 1, the user who evaluates the 3D model in the 3D model evaluation system 1 operates the operation unit 203 of the user terminal device 2 such that the control unit 201 of the user terminal device 2 loads the 3D model data of the 3D model, which is designed by the designer, from the storage unit 402 of the server device 4.

The user who evaluates the 3D model opens the 3D CAD program and opens the 3D model evaluation program accompanying the 3D CAD program, or opens the 3D model evaluation program stored separately from the 3D CAD program.

The control unit 201 of the user terminal device 2 performs an operation of evaluating the read 3D model data of the 3D model on the basis of a 3D model evaluation program.

First, in a case of evaluating the 3D model data of the 3D model, the control unit 201 of the user terminal device 2 evaluates whether or not the 3D model data refers to the base layout diagram on the basis of a layout utilization criterion.

Specifically, as shown in FIG. 10, the control unit 201 of the user terminal device 2 determines whether or not there is a sketch named the history "BASE LAYOUT" corresponding to the base layout diagram created in 2D at the top of the creation history with respect to the history of the loaded 3D model data.

(1) Layout Utilization Criterion

First, as a layout utilization criterion, a base layout diagram is created, and it is determined whether or not the layout is used as a criterion for modeling.

Regarding the layout utilization criterion, on the basis of the following expression, a numerical value (ratio), which is obtained by dividing the total number of sketch features that refer to the layout sketch among the sketches used in the feature by the total number of sketches used in the feature, is used as a criterion for determining whether or not a layout sketch is created and is used in a reference for modeling.

$$\text{Point }(P) = \frac{\text{Total Number of Sketch Features That Refer to Layout Sketch among Sketches Used in Feature}}{\text{Total Number of Sketches Used in Feature}} \times 100$$

In Exemplary Embodiment 1, as shown in FIG. 18, all the sketches used in the feature refer to the layout sketch. Thus, the total number of sketch features that refers to the layout sketch among the sketches used in the feature is equal to the total number of sketches used in the feature, and the number of points is 100.

The evaluation is performed in 5 levels on the basis of the points. In a case where the point is 50 or more, the evaluation is the best, and the evaluation in 5 levels is "5". Next, in a case where the point is 30 or more and less than 50, the evaluation is next best, and the evaluation in 5 levels is "4". In a case where the point is 10 or more and less than 30, the evaluation is next best, and the evaluation in 5 levels is "3". In a case where the point is 5 or more and less than 10, the evaluation is the fourth best, and the evaluation in 5 levels is "2". In a case where the point is less than 5, the evaluation is the worst, and the evaluation in 5 levels is "1".

COMPARATIVE EXAMPLE 1

Figure 19:
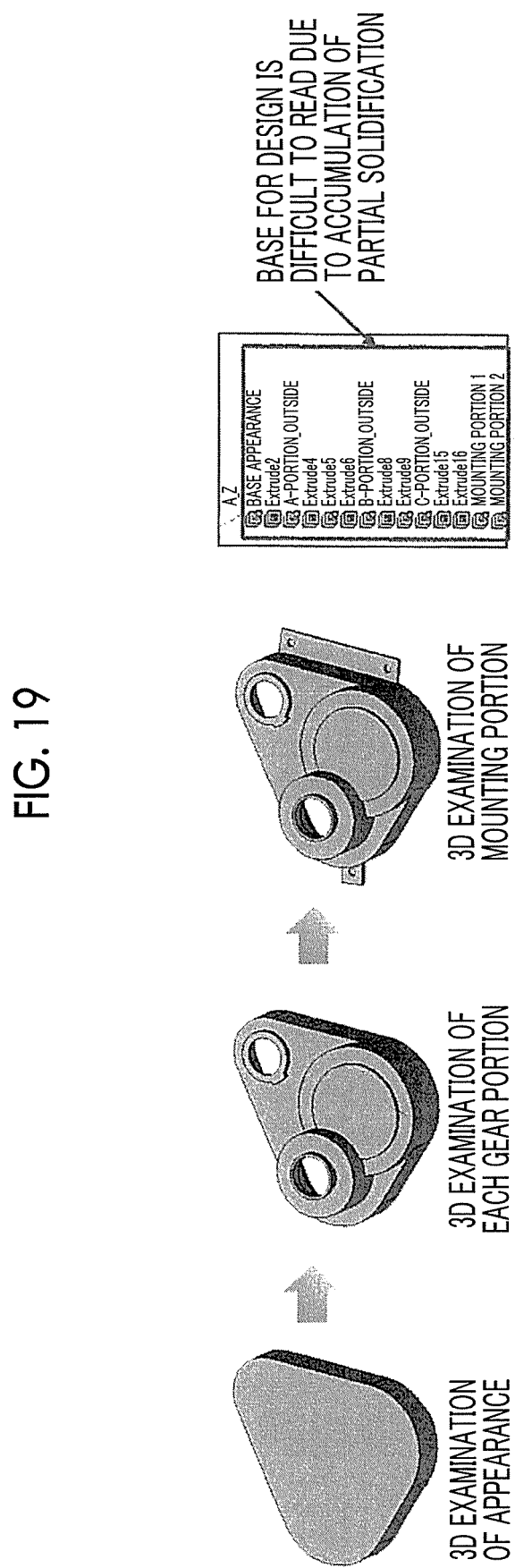
FIG. 19 is an explanatory diagram showing a design process using 3D CAD in Comparative Example 1.

In Comparative Example 1, as shown in FIG. 19, the shape is examined while creating a 3D model without creating a layout sketch. Therefore, in a case of performing examination again such as a case of design change, the base layout diagram showing the design intent is not created, and also there is no function-based layout diagram. Therefore, it is difficult to read the design intent due to the number of correction processes of 3D model.

The evaluation point is "0" since the total number of sketch features that refers to the layout sketch among the sketches used in the feature is zero, and the evaluation is the lowest evaluation "1".

(2) Function-Based Layout Criterion

Next, in a case where the design target designed by 3D CAD is divided into a plurality of functions, the control unit 201 of the user terminal device 2 executes evaluation for evaluating whether a function-based layout diagram corresponding to each of the plurality of functions is created, on the basis of the function-based layout criterion.

Here, on the basis of the following expression, a numerical value, which is obtained by dividing the total number of layout sketches used as function-based layouts by the total number of sketches used in the feature, is used as a criterion for determining whether or not a sketch classified for each function during creation of the layout sketch is created.

$$\text{Point }(P) = \frac{\text{Total Number of Layout Sketches Used as Function-Based Layouts}}{\text{Total Number of Sketches Used in Feature}} \times 100$$

The evaluation is performed in 5 levels on the basis of the points. In a case where the point is 20 or more, the evaluation is the best, and the evaluation in 5 levels is "5". Next, in a case where the point is 10 or more and less than 20, the evaluation is next best, and the evaluation in 5 levels is "4". In a case where the point is 5 or more and less than 10, the evaluation is next best, and the evaluation in 5 levels is "3". In a case where the point is 0.5 or more and less than 5, the evaluation is the fourth best, and the evaluation in 5 levels is "2". In a case where the point is less than 0.5, the evaluation is the worst, and the evaluation in 5 levels is "1".

In Exemplary Embodiment 1, the total number of layout sketches used as the part layout is 6, and the total number of sketches used in the feature is also 6. In Exemplary Embodiment 1, since the point of the layout utilization criterion is 100, the evaluation is the highest evaluation "5".

COMPARATIVE EXAMPLE 2

In Comparative Example 2, as shown in FIG. 19, the shape is examined while creating a 3D model without creating a layout sketch. Therefore, the total number of layout sketches used as the function-based layouts is zero.

(3) Reference Plane Utilization Criterion

After that, the control unit 201 of the user terminal device 2 executes evaluation for evaluating whether the 3D model data utilizes the reference plane, on the basis of a reference plane utilization criterion.

The numerical value, which is obtained by dividing the total number of sketches drawn on the reference plane by the total number of sketches used in feature, is used as a criterion for determining whether or not the reference plane is used for defining the sketch plane at the time of sketch drawing.

$$\text{Point } (P) = \frac{\text{Total Number of Sketches Drawn on Reference Plane}}{\text{Total Number of Sketches Used in Feature}} \times 100$$

In Exemplary Embodiment 1, the total number of sketches drawn on the reference plane is 6, and the total number of sketches used in feature is 6.

The evaluation is performed in 5 levels on the basis of the points. In a case where the point is 90 or more, the evaluation is the best, and the evaluation in 5 levels is "5". Next, in a case where the point is 70 or more and less than 90, the evaluation is next best, and the evaluation in 5 levels is "4". In a case where the point is 50 or more and less than 70, the evaluation is next best, and the evaluation in 5 levels is "3". In a case where the points are 20 or more and less than 50, the evaluation is the fourth best, and the evaluation in 5 levels is "2". In a case where the number of points is less than 20, the evaluation is the worst, and the evaluation in 5 levels is "1".

COMPARATIVE EXAMPLE 3

Figure 20:
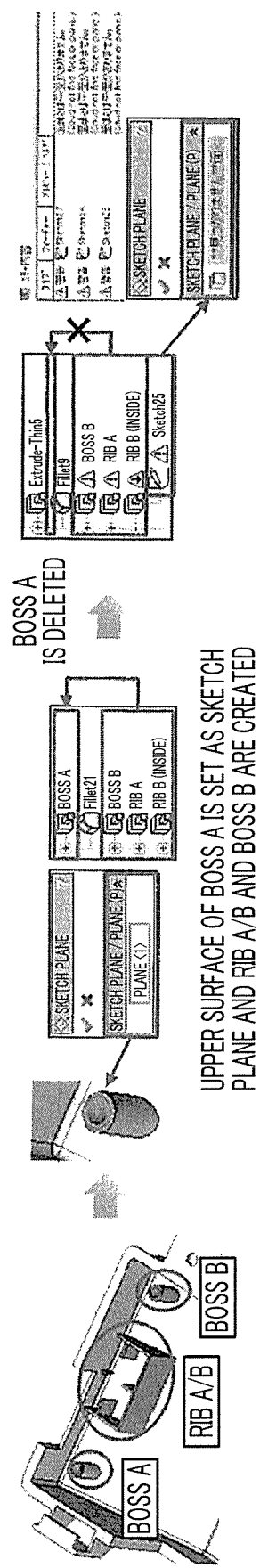
FIG. 20 is an explanatory diagram showing a design process using 3D CAD in Comparative Example 3.

In Comparative Example 3, as shown in FIG. 20, a sketch plane is defined on the surface of the boss and another shape is defined above the boss. Therefore, in a case where the boss is deleted by changing the shape, the sketch plane is lost and an error occurs.

(4) Indirect Solid Reference Criterion

Further, the control unit 201 of the user terminal device 2 executes evaluation for evaluating whether the 3D model data does not directly refer to a solid, on the basis of an indirect solid reference criterion.

A numerical value, which is obtained by dividing the total number of sketches without direct reference to the model shape among the sketches used in the feature by the total number of sketches used in the feature, is used as a criterion for determining whether the edges or faces of the model shape are directly referred to in the sketch drawing.

$$\text{Point } (P) = \frac{\substack{\text{Total Number of Sketches without Direct Reference} \\ \text{to Model Shape among Sketches Used in Feature}}}{\text{Total Number of Sketches Used in Feature}} \times 100$$

The evaluation is performed in 5 levels on the basis of the points. In a case where the point is 80 or more, the evaluation is the best, and the evaluation in 5 levels is "5". Next, in a case where the point is 50 or more and less than 80, the evaluation is next best, and the evaluation in 5 levels is "4". In a case where the point is 30 or more and less than 50, the evaluation is next best, and the evaluation in 5 levels is "3". In a case where the point is 10 or more and less than 30, the evaluation is the fourth best, and the evaluation in 5 levels is "2". In a case where the point is less than 10, the evaluation is the worst, and the evaluation in 5 levels is "1".

COMPARATIVE EXAMPLE 4

Figure 21:
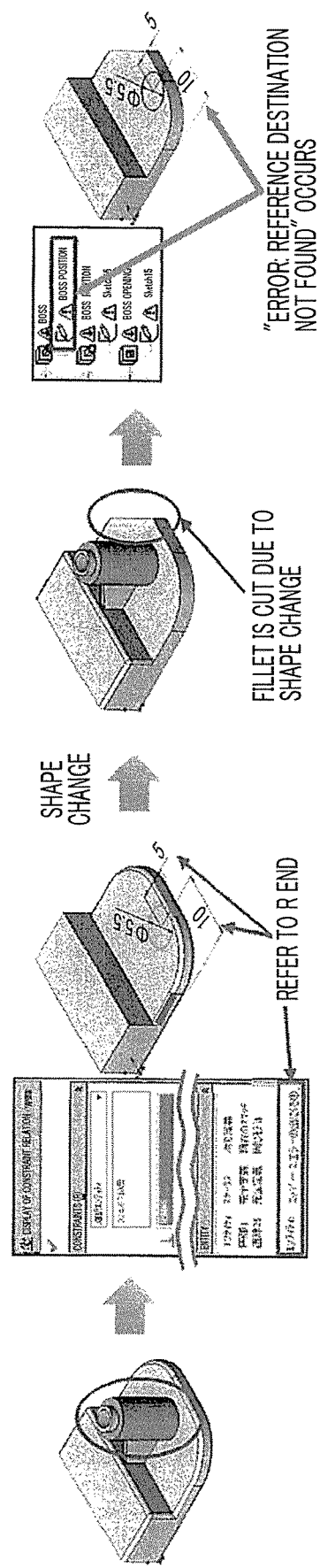
FIG. 21 is an explanatory diagram showing a design process using 3D CAD in Comparative Example 4.

In Comparative Example 4, as shown in FIG. 21, since the sketch of the boss defines the dimension from the edge, in a case where the edge disappears due to the shape change, the reference destination is lost and an error occurs.

(5) Direct Feature Creation Reference Criterion

The control unit 201 of the user terminal device 2 executes evaluation for evaluating whether the 3D model data directly refers to the edge or face of the model shape in a case of creating the feature, on the basis of a direct feature creation reference criterion.

Regarding a direct feature creation reference criterion, on the basis of the following expression, numerical values (ratio), which are obtained by dividing the total number of features that refers to the model by the number of boss, base, cut, and pattern features, the number of reference planes, and the number of reference geometries, are calculated, and are used as a criterion for determining whether the edge or face of the model shape is directly referred to in the shape creation feature. It should be noted that the added value is used as the denominator.

$$\text{Point } (P) = \frac{\text{Total Number of Sketches}}{\substack{\text{Number of Boss and Base Features,} \\ \text{Number of Cut Features,} \\ \text{Number of Pattern Features,} \\ \text{Number of Reference Planes} \begin{pmatrix} \text{Including Presence or} \\ \text{Absence of Child Feature} \end{pmatrix}, \\ \text{Number of Reference Geometries} \begin{pmatrix} \text{Including Presence or} \\ \text{Absence of Child Feature} \end{pmatrix}}} \times 100$$

The reference geometry defines the shape of a face or a solid. The reference geometry includes planes, axes, coordinate systems, and points. The reference geometry can be used in a case of creating features.

The evaluation is performed in 5 levels on the basis of the points. Only in a case where the point is 100, the evaluation is the best and the evaluation in 5 levels is "5". Next, in a case where the point is 75 or more and less than 100, the evaluation is next best, and the evaluation in 5 levels is "4". In a case where the point is 50 or more and less than 75, the evaluation is next best, and the evaluation in 5 levels is "3". In a case where the points are 25 or more and less than 50, the evaluation is the fourth best, and the evaluation in 5 levels is "2". In a case where the number of points is less than 25, the evaluation is the worst, and the evaluation in 5 levels is "1".

COMPARATIVE EXAMPLE 5

Figure 22:
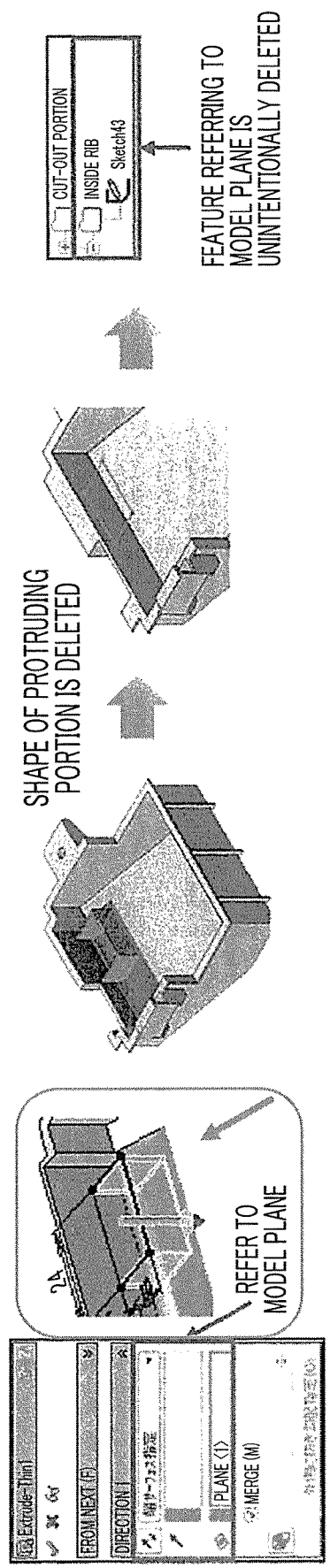
FIG. 22 is an explanatory diagram showing a design process using 3D CAD in Comparative Example 5.

In Comparative Example 5, as shown in FIG. 22, the extruded feature (Extrude) destination is defined on the model plane. Therefore, in a case where the model plane of the extruded feature (Extrude) destination is deleted due to shape change, the model plane of the extruded feature (Extrude) destination no longer exists and an error occurs.

As described above, the control unit 201 of the user terminal device 2 in the 3D model evaluation system 1 performs evaluation by analyzing and calculating the total number of sketches used in the feature and the total number of sketch features that refers to the layout sketch on the basis of the five evaluation items described above and calculating, for example as numerical values of 5 levels, the layout utilization criterion, the function-based layout criterion, the reference plane utilization criterion, the indirect solid reference criterion, and the direct feature creation reference criterion described above.

Figure 24:
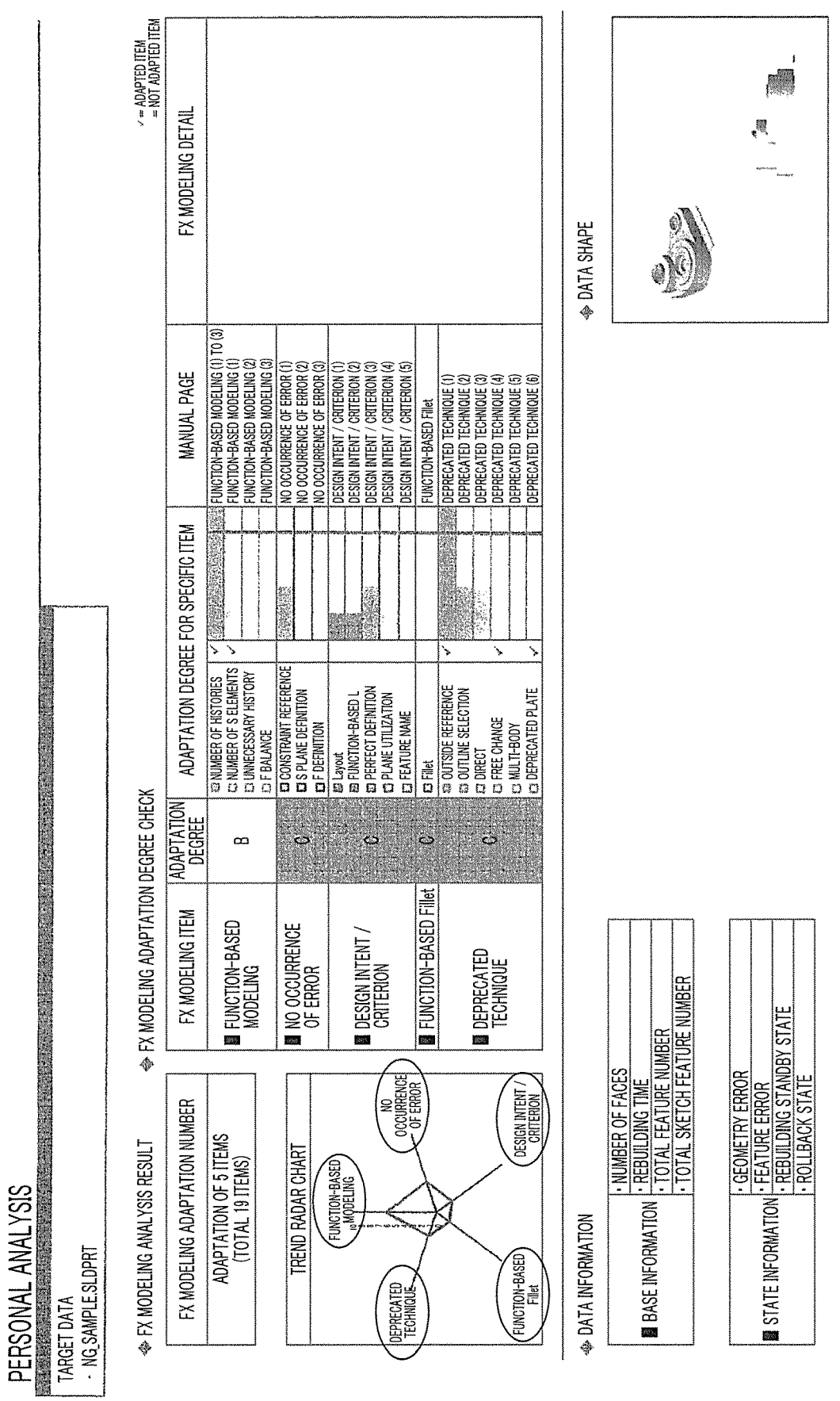
FIG. 24 is a chart showing evaluation results using the 3D model evaluation system according to Exemplary Embodiment 1 of the present invention.

In addition, as shown in FIGS. 23 and 24, the 3D model evaluation system 1 creates a trend radar chart as an example of a graph on the basis of a 5-level evaluation value by using the evaluation result as a numerical value for each evaluation item, notes the contents of the evaluation items in a table as a fixed text corresponding to numerical values or evaluation values, and displays the chart on the display unit 205 of the user terminal device 2 or prints the chart through the image forming apparatus 5.

Therefore, the 3D model evaluation system 1 according to Exemplary Embodiment 1 is able to evaluate the easiness in utilizing the 3D model data in a case of design change, the degree of occurrence of an error, and the like with reference to the evaluation values of the criteria. The criteria includes: the layout utilization criterion, the function-based layout criterion, the reference plane utilization criterion, the indirect solid reference criterion, and the direct feature creation reference criterion.

As described above, using the 3D model evaluation system 1 according to Exemplary Embodiment 1, it becomes easy to evaluate a degree of easiness in utilizing the 3D model data in comparison with the case of acquiring and evaluating the information about the unit configuration of the product and constituent parts in the units, the material information about the material of each part, and the processing information are acquired from 3D CAD.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A 3D model evaluation system comprising:
    a loading unit that loads 3D model data created by 3D CAD;
    a history checking unit that checks a creation history which is added to the 3D model data loaded by the loading unit and which is obtained in a case where the 3D model data is created by the 3D CAD; and
    an evaluation unit that evaluates a degree of coincidence between the creation history of the 3D model data checked by the history checking unit and a predetermined rule,
    wherein the creation history includes a history of creation of the 3D model data, and the evaluation unit evaluates the degree of coincidence between the history of the creation of the 3D model data and the predetermined rule.

2. The 3D model evaluation system according to claim 1, wherein the evaluation unit evaluates whether a two-dimensional base layout diagram is at a top of the creation history as the creation history obtained in a case where the 3D model data is created by the 3D CAD.

3. The 3D model evaluation system according to claim 2, wherein the evaluation unit evaluates a ratio at which the 3D model data refers to the base layout diagram.

4. The 3D model evaluation system according to claim 1, wherein in a case where a design target designed by the 3D CAD is divided into a plurality of functions, the evaluation unit evaluates whether a function-based layout diagram corresponding to each of the plurality of functions is created.

5. The 3D model evaluation system according to claim 4, wherein the evaluation unit evaluates presence or absence of the 3D model data that is not referred to in the function-based layout diagram.

6. The 3D model evaluation system according to claim 1, wherein the evaluation unit evaluates an evaluation result as a numerical value for each evaluation item.

7. The 3D model evaluation system according to claim 6, wherein the evaluation unit evaluates the 3D model data on the basis of at least one or more criteria of a layout utilization criterion for evaluating whether the 3D model data refers to the base layout diagram, a function-based layout criterion for evaluating whether a function-based layout diagram corresponding to each of a plurality of functions is created in a case where a design target designed by the 3D CAD is divided into the plurality of functions, a reference plane utilization criterion for evaluating whether the 3D model data utilizes a reference plane, an indirect solid reference criterion for evaluating whether the 3D model data directly refers to a solid, and a direct feature creation reference criterion for evaluating whether the 3D model data directly refers to an edge or a face of a model shape in a case of creating a feature.

8. The 3D model evaluation system according to claim 7, wherein the evaluation unit displays, as graphs, evaluation results based on the layout utilization criterion, the function-based layout criterion, the reference plane utilization criterion, the indirect solid reference criterion, and the direct feature creation reference criterion.

* * * * *